United States Patent [19]

Welsch et al.

[11] 4,346,498

[45] Aug. 31, 1982

[54] SHOCK RESISTANT CASTER ASSEMBLY

[75] Inventors: John H. Welsch, Moscow; Charles W. Nicely, Dallas, both of Pa.; Frederick C. Greene, Bellflower, Calif.

[73] Assignee: Metropolitan Wire Corporation, Wilkes-Barre, Pa.

[21] Appl. No.: 182,437

[22] Filed: Aug. 29, 1980

[51] Int. Cl.³ .............................................. A47B 91/00
[52] U.S. Cl. ....................................................... 16/44
[58] Field of Search ....................................... 16/44, 18

[56] References Cited

U.S. PATENT DOCUMENTS 1,745,992  2/1930  Herold ..................................... 16/44
3,566,433  3/1971  Lewin ...................................... 16/44

FOREIGN PATENT DOCUMENTS 617428  1/1935  Fed. Rep. of Germany .......... 16/44
2833330  2/1980  Fed. Rep. of Germany .......... 16/44
2399328  4/1979  France ................................... 16/44
 357523 11/1961  Switzerland ........................... 16/44

Primary Examiner—Doris L. Troutman
Attorney, Agent, or Firm—Friedman, Goodman & Teitelbaum

[57] ABSTRACT

A shock resistant caster assembly having a wheel positioned in a housing formed of at least two sections vertically displaceable with respect to each other, one of the housing sections being coupled to the wheel at its rotational axis. A shock pad of elastomeric material is positioned between the housing sections for resiliently cushioning the vertical displacement between the housing sections.

8 Claims, 5 Drawing Figures

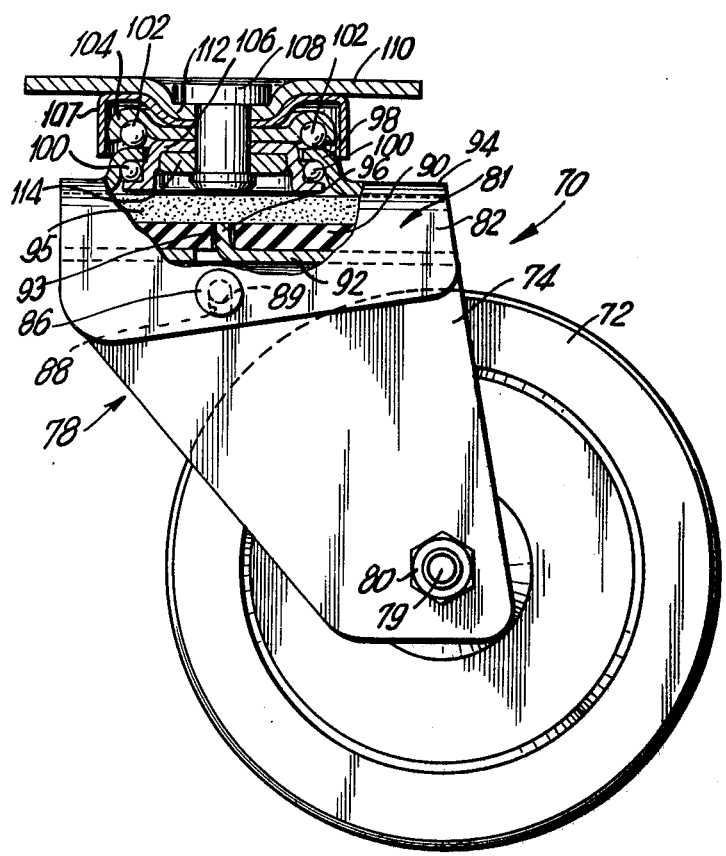
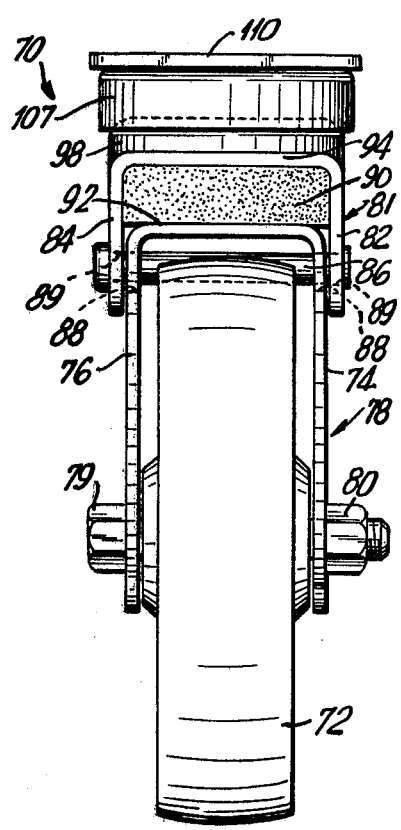
FIG. 4
FIG. 5

4,346,498

SHOCK RESISTANT CASTER ASSEMBLY

BACKGROUND OF THE INVENTION

This invention relates to casters, and more particularly to a shock resistant caster assembly.

Casters are well known in the art for use in mobile equipment. These casters, during normal use, are subjected to impact loads which in many instances may cause damage to the casters so that the casters cannot function properly. Accordingly, some casters, particularly those used in industrial applications, are manufactured with shock absorbing mechanisms so that the casters can carry very heavy loads, and are resistant to sudden shocks. However, in the past, these casters usually include complex spring arrangements with numerous parts and mechanisms. These shock absorbing mechanisms are generally costly, complex to install and maintain, and are generally cumbersome.

One of the biggest drawbacks of the prior art arrangements, is that they cannot readily be cleaned and maintained. For some fields of interest, such as the food service industry, it is essential that all parts be readily cleaned. Because of the complex nature of the prior art spring arrangement, such prior art shock absorbing casters are not usually used on mobile carts which are designed for the food service industry. These complex casters would not be readily cleanable, and accordingly would not comply with the requirements of the National Sanitation Foundation.

SUMMARY OF THE INVENTION

Accordingly, it is an object of the present invention to provide a shock resistant caster assembly which avoids the problems of the prior art devices.

Another object of the present invention is to provide a shock absorbing caster assembly which can readily be cleaned so as to comply with the various sanitation regulations.

Yet another object of the present invention is to provide a shock resistant caster which can be easily manufactured, can be readily assembled, is sturdy, is durable and can be easily maintained in use.

Briefly, in accordance with the present invention there is provided a caster assembly having a wheel to which is connected a housing having at least two sections. The two housing sections are vertically displaceable with respect to each other. One of the housing sections is coupled to the wheel at the wheel's rotational axis. A shock pad is positioned between the housing sections for resiliently cushioning the vertical displacement therebetween.

In a preferred embodiment of the present invention, the pad is formed of a flat elastomeric member having a hollow recess formed in one surface thereof defining a frame of elastomeric material around the recess.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 4 is a partly broken away side elevational view of another embodiment of the caster assembly in accordance with the present invention, showing a swivel type caster; and FIG. 5 is a left end view of the caster shown in FIG. 4.

In the various figures of the drawing, like reference characters designate like parts.

DETAILED DESCRIPTION OF THE PREFERRED EMBODIMENT

Figure 1:
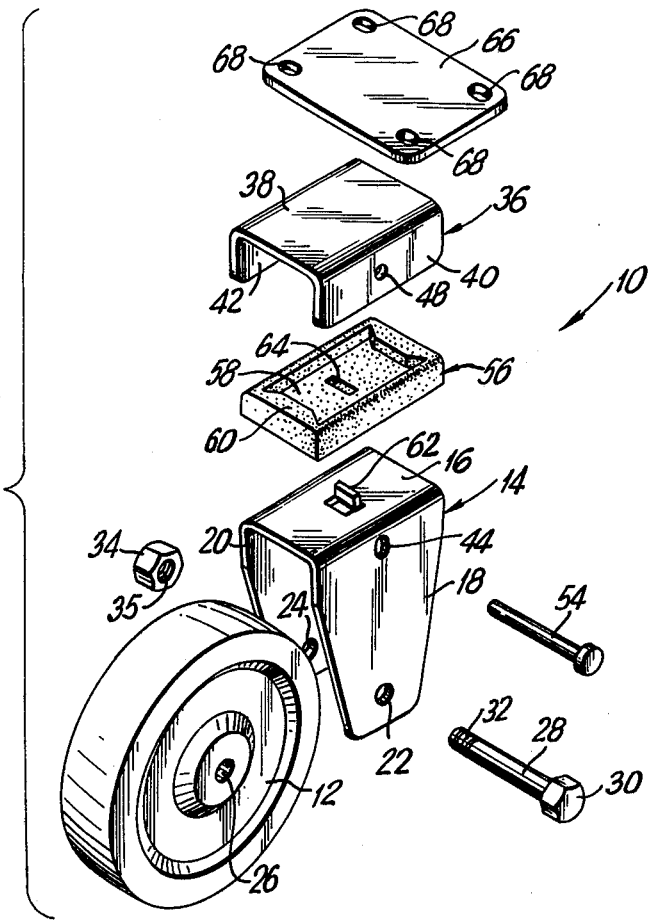
FIG. 1 is an exploded view of the various parts of the caster assembly in accordance with an embodiment of the present invention, showing a fixed type caster.
Figure 2:
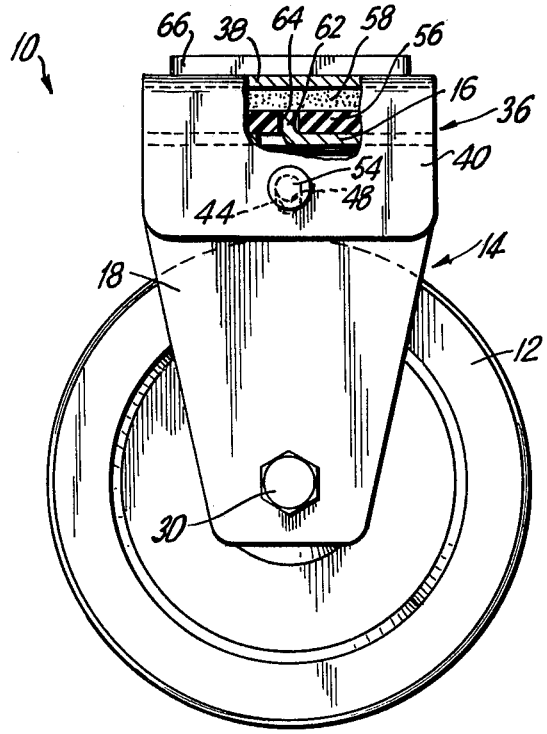
FIG. 2 shows a partly broken away side elevational view of the caster shown in FIG. 1.
Figure 3:
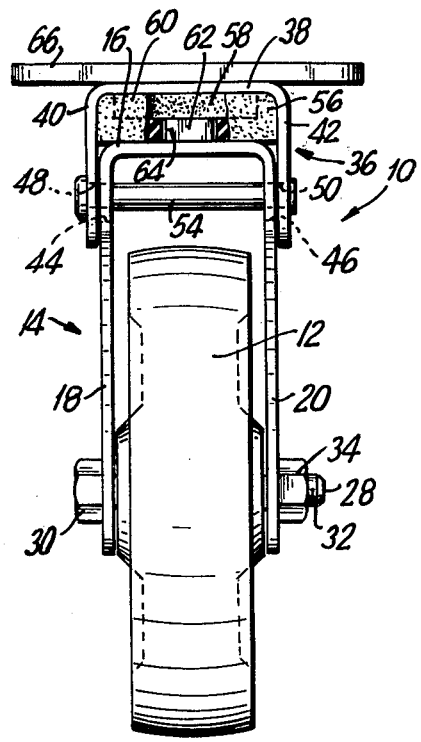
FIG. 3 shows a partly broken away right end view of the caster shown in FIG. 1.

Referring now to FIGS. 1-3, there is shown a caster assembly 10 in accordance with the present invention, including a wheel 12 mounted within a yoke assembly. The yoke assembly includes a lower housing section in the form of a yoke member 14 shown as an inverted U-shaped member having a bight portion 16 maintained in substantially horizontal orientation with two downwardly depending legs 18, 20. Adjacent the distal ends of the legs 18, 20 are holes 22, 24, which are registered with the axle hole 26 of the wheel 12. An axle, shown as a bolt 28 having a bolt head 30 and a threaded end 32, passes through the registered holes 22, 24 and the axle hole 26 of the wheel 12, and is locked in place by means of the nut 34 having a threaded opening 35 therethrough, so as to provide axial rotation of the wheel within the lower yoke member 14.

An upper housing section of the yoke assembly is provided in the form of an inverted U-shaped cap member 36 having an upper horizontal flat section 38 with downwardly depending arms 40, 42. The cap member 36 is coupled with respect to the yoke member 14 so as to permit vertical displacement therebetween. Specifically, adjacent the medial edges of the legs 18, 20, are provided elongated slots 44, 46. Registered with these slots are corresponding circular clearance holes 48, 50 contained in the respective arms 40, 42. A rivet 54, or other similar fastening member, passes through the registered holes 48, 50 in the arms 40, 42 and registered slots 44, 46 in the legs 18, 20, so as to securely maintain the cap member 36 fastened onto the yoke member 14. However, because of the elongated shape of the slots 44, 46, the cap member 36 is vertically displaceable with respect to the yoke member 14, the vertical movement being restricted between the limits established by the slots 44, 46.

Sandwiched between the cap member 36 and the yoke member 14 is an elastomeric member 56 formed as a substantially flat pad. The pad is shown to be rectangular in shape to fit within the correspondingly shaped bight section 16 of the yoke member 14 and the correspondingly shaped flat section 38 of the cap member 36.

It has been found, that in order to improve the shock resistant nature of the caster assembly, a hollow recess 58 is formed in one surface of the elastomeric member 56. The recess 58 defines a rectangular frame 60 of elastomeric material therearound. Although the elastomeric member 56 can be used without the recess, the shock absorbing qualities of the caster have been found greatly improved by the presence of such recess.

In order to prevent lateral movement of the pad member 56, a locating tab 62 is struck upward from the bight surface 16 of the yoke member 14 and is received in a corresponding locating slot 64 formed through the bottom wall or surface of the recess 58 of the elastomeric member 56. In this way, the tab 62 extends upward into the elastomeric member and retains it in place, thus preventing lateral displacement thereof.

The particular caster assembly shown in FIGS. 1-3 is of the fixed or rigid type, and accordingly, includes a top plate 66 having corner holes 68 therethrough. The top plate 66 is mounted directly onto the upper surface 38 of the cap member 36 by suitable means well known in the art, such as soldering, welding, or the like. The holes 68 are utilized for mounting the caster assembly directly onto the lower surface of a mobile equipmemt, such as a cart, wherein the holes 68 receive suitable fastener means therethrough, such as bolts, rivets and the like.

Referring now to FIGS. 4 and 5, it is shown that the present invention can also be utilized with a swivel type caster assembly, shown generally at 70. The caster assembly 70 includes a wheel 72 mounted between the legs 74, 76 of yoke member 78. Bolt 79 is utilized as the axle passing through suitable openings in the lower ends of the legs and through the wheel 72, being locked in place by the nut 80, in a manner set forth above.

The cap member 81 has its downwardly depending arms 82, 84 coupled to the upper ends of the legs 74, 76 by means of a rivet 86 in a similar manner as the above mentioned rivet 54. Accordingly, the elongated slots 88 in the yoke member 78 and the aligned holes 89 in the cap member 81 permit vertical displacement of the cap member 81 with respect to the yoke member 78 in the manner set forth above.

The elastomeric member 90 is sandwiched between the bight section 92 of the yoke member 78 and the flat portion 94 of the cap member 81. Tab 96 extends upwardly from the bight section 92 into a receiving slot 93 extending through the bottom wall of the recess 95 in the elastomeric member to position the elastomeric member 90 and prevent it from lateral movement. The recess 95 is formed in the elastomeric member 90 to provide an elastomeric rectangular frame in the same manner as the above mentioned recess 58 in the elastomeric member 56, and for the same function thereof.

Heretofore, the description of the embodiment shown in FIGS. 4 and 5 has been similar to the caster assembly 10 shown in FIGS. 1-3, wherein the modified parts to provide a swivel type caster assembly will now be set forth.

The cap member 81 includes a circular flange or rim 98 upwardly extending from the flat portion 94, which is free to move within the ball bearing assembly including the lower ball bearings 100 and the upper ball bearings 102. The ball bearings are free to move within the raceways defined by a circular upper plate 104 and a circular lower plate 106, which sandwich the flange 98 between the upper and lower ball bearings. A circular housing 107 is positioned above the flange 98 to cover the upper plate 104 and the upper ball bearings 102.

A rivet 108 secures the top plate 110 onto the caster assembly and also secures the parts of the caster assembly together by passing through a hole formed in the recess 112 of the top plate 110, and extending through aligned holes formed in the housing 107, the upper plate 104 and the lower plate 106. A washer 114 is disposed between the lower plate 106 and the flattened end of the rivet 108. The upper plate 110 is preferably provided with corner holes therethrough and can be used for mounting onto the lower portion of a mobile equipment, such as a cart, in the same manner as the above mentioned top plate 66. The caster assembly 70 will therefore provide rolling and pivotal movement typical of a swivel type caster.

It should be appreciated that by means of the present invention, shock absorbing characteristics and properties are added to the caster assembly so that it will not be damaged with very heavy loads. At the same time, because of its simplified assembly, it can be easily cleaned wherein suitable cleanliness and maintenance of the casters can be maintained in order to comply with the sanitation requirements. As a result, such caster assemblies can be utilized upon mobile carts in the food service industry, and in similar related industries.

The particular arrangement of the yoke assembly can be modified. For example, in the embodiment shown in FIGS. 1-3, the yoke is arranged such that the rivet 54 is coaxial and aligned with the central axis 28. However, in the embodiment shown in FIGS. 4 and 5, an offset arrangement of the rivet 86 is provided with respect to the axle 79.

In the embodiments shown, only a single fastening pin or rivet was utilized between the cap member and the yoke member. As a result, not only vertical displacement is obtained, but pivotal movement is also permitted between the cap member and the yoke member. Should only vertical movement be desired, two laterally spaced apart pins or rivets could be utilized instead of the single pin. Alternately, one pin or rivet could be utilized at a laterally extended location in order to permit pivotal movement about one end of the connection. Also, even if two pins or rivets were utilized, one of the pins could be positioned without any elongated slot associated therewith so as to provide a pivot point, and the other pin could move within elongated slots permitting vertical displacement as well as facilitating pivotal movement.

Additionally, the particular shape and arrangement of the yoke cap members could be modified. For example, the upper section could include arms that extend further down in a stepped arrangement, while the lower section would only include two stepped legs without any bight portion. In this case, two sections of elastomeric material would be utilized on either side of the wheel, each elastomeric section being disposed between the stepped portions of the upper and lower sections which are joined together by suitable means to permit vertical movement therebetween. Other similar modifications can be utilized, as may become obvious from the aforegoing description.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A caster assembly comprising:
   a wheel having an opening therethrough to define a rotational axis;
   a housing having at least two sections;
   first means securing said sections together to permit vertical displacement of said sections with respect to each other;
   second means coupling one of said housing sections to said wheel at the rotational axis thereof;
   shock pad means positioned between said housing sections for resiliently cushioning the vertical displacement therebetween, said shock pad means including an elastomeric member;

said first means including a rivet disposed between said housing sections for limiting the vertical displacement between said sections, said rivet passing through elongated slots provided in one of said sections and holes provided in the other section to further permit pivotal movement thereabout between said sections;

said housing including a yoke assembly having upper and lower sections, said second means including a bolt for rotatingly coupling said wheel to said lower section;

connection means coupled to said upper section for connection of the caster assembly to a mobile device; and said lower section including an inverted U-shaped yoke member having a bight portion and downwardly depending legs, said bolt coupling said legs to said wheel, said upper section including a cap member spaced above said bight portion, and said elastomeric member being resiliently sandwiched between said cap member and said bight portion.

2. A caster assembly as in claim 1, wherein said elastomeric member has a flat body with a hollow recess provided in one surface thereof to define a frame of elastomeric material around said hollow recess, said hollow recess facing one of said two housing sections with said one housing section resting on said frame.

3. A caster assembly as in claim 1, and further comprising a locating tab upwardly extending from said bight portion, and a locating slot provided in said elastomeric member for receiving said locating tab to thereby securely position said elastomeric member in place.

4. A caster assembly as in claim 1, and wherein said cap member includes downwardly extending arms, said elongated slots extending through said legs of said yoke member adjacent said bight portion, said holes extending through said arms of said cap member in alignment with said elongated slots for receiving said rivet therethrough to couple said cap and yoke member together.

5. A caster assembly as in claim 1, wherein said connection means includes a top plate mounted onto an upper surface of said upper section to define a rigid type caster assembly.

6. A caster assembly as in claim 5, wherein said top plate has corner holes therethrough, fastener means being receivable through said holes for mounting said caster assembly onto a lower surface of the mobile device.

7. A caster assembly as in claim 1, wherein said connection means includes a ball bearing assembly secured between an upper surface of said upper section and a top plate to define a swivel type caster assembly.

8. A caster assembly as in claim 7, wherein said ball bearing assembly includes upper and lower ball bearings which move within raceways defined by upper and lower circular plates respectively, a circular flange extending upwardly from said upper section and being sandwiched between said upper and lower ball bearings for securement therebetween, and rivet means for securing said ball bearing assembly to said top plate.

* * * * *